United States Patent [19]
de Sivry et al.

[11] 4,430,550
[45] Feb. 7, 1984

[54] ELECTRON BEAM WELDING

[75] Inventors: Bruno J. M. de Sivry, Paris; Claude R. Carsac, St. Leu La Foret; Christian Bonnet, St. Gervais, all of France

[73] Assignee: Compagnie Francaise des Petroles, Paris, France

[21] Appl. No.: 385,964

[22] Filed: Jun. 7, 1982

Related U.S. Application Data

[62] Division of Ser. No. 186,078, Sep. 11, 1980, Pat. No. 4,358,656.

[30] Foreign Application Priority Data

Sep. 14, 1979 [FR] France ................................ 79 22948

[51] Int. Cl.³ .............................................. B23K 15/00
[52] U.S. Cl. ...................... 219/121 ED; 219/121 EN
[58] Field of Search .................. 219/121 EL, 121 EN, 219/121 EC, 121 ED, 121 EB, 121 EM

[56] References Cited
U.S. PATENT DOCUMENTS

| | | | |
|---|---|---|---|
| 3,165,619 | 1/1965 | Cohen | 219/121 EC |
| 3,483,352 | 12/1969 | Schollhammer | 219/121 EC |
| 4,286,137 | 8/1981 | Thome | 219/121 EC |

FOREIGN PATENT DOCUMENTS 2054742  10/1971  France .......................... 219/121 EM

*Primary Examiner*—C. L. Albritton
*Attorney, Agent, or Firm*—Sughrue, Mion, Zinn, Macpeak and Seas

[57] ABSTRACT

The characteristics of a weld made by electron beam welding are improved by introducing into the region of the pieces to be welded, which is subjected to remelting during welding, a material which is obtained by applying an arc welding process, or a process for remelting under slag, to a mild or slightly alloyed steel. The introduction of the material into the region of the weld increases the production of acicular ferrite which increases the tensile strength of the weld. The material may be introduced by providing a deposit of it over part or the whole of the surface of one or both of the pieces to be welded, by introducing a mass of it between the surfaces to be welded or as a filler wire.

8 Claims, 7 Drawing Figures

ELECTRON BEAM WELDING

This is a division of application Ser. No. 186,078, filed Sept. 11, 1980, which issued as U.S. Pat. No. 4,358,656 on Nov. 9, 1982.

The present invention relates to an improved electron beam welding process and to an apparatus for use in carrying out this process.

It is known that the mechanical and metallurgical characteristics, such as the tensile strength, the hardness or the resilience, of a weld, considered in the crude state of solidification, that is to say before any heat treatment, depend on the chemical composition of the molten zone and also on the welding heat cycle to which the weld has been subjected.

It is also known that, for a given chemical composition, the best tensile strength characteristics, and in particular resilience characteristics, are obtained when the structure of the molten zone is rich in acicular ferrite.

As far as the heat cycle is concerned, it is determined by the morphology which it is desired to impart to the weld.

Thus, in the final analysis, the structure of the weld, and consequently its mechanical characteristics, will depend only on the chemical composition of the molten metal. However, it has recently been shown that by varying the proportion of added elements, such as carbon, manganese, silicon, nickel, chromium, molybdenum, sulphur, lead, niobium, vanadium, boron and the like, which are traditionally considered as characterising the chemical composition of steel, it is not possible to obtain a substantial amount of acicular ferrite in the molten zone.

In fact, it has become apparent that, during the conversion of the austenite while a weld is cooling, the formation of the acicular ferrite is related to the existence of certain fine non-metallic inclusions which are dispersed in the mass and which serve as seeds for the formation of the acicular ferrite.

The presence of oxygen in amounts of between 100 and 800 ppm seems to govern the presence of these seeds. These proportions of oxygen are frequently encountered in welds produced by means of conventional arc welding processes, such as submerged-arc welding, inert-gas metal-arc welding, inert-gas tungsten-arc welding, welding with coated wires, with or without a protective gas, welding with coated electrodes, plasma torch welding and the like, and it is in fact found that the microstructure of welds of this kind can be relatively rich in acicular ferrite for a wide range of heat cycles. However, the proportions of oxygen encountered in welds produced by means of an electron beam are generally less than the abovementioned values, with the result that micrographic observation of these welds, carried out on mild or slightly alloyed steels, virtually never reveals substantial amounts of acicular ferrite.

According to the present invention, a material, obtained by applying an arc welding process or process for remelting under slag to a mild or slightly alloyed steel, is introduced into a region of the pieces to be welded which is subjected to remelting during the electron beam welding operation.

A mass of the material may be provided or deposited on at least one face of at least one of the pieces to be joined, the material being obtained by means of an arc welding process, such as, in particular, one of those already mentioned, or by remelting under slag, and a surface which is to be juxtaposed with a surface of the other piece is produced, the surface extending in a plane passing through the mass of the material.

Alternatively, the material may be provided in the form of a wire obtained by drawing a metal ingot formed by melting, either by an arc welding process or by a process for remelting under slag, the wire being brought to the molten region of the pieces during the production of the weld by means of an electron beam. It is under the action of the electron beam that a structure which is very rich in acicular ferrite and hence favors the attainment of good tensile strength characteristics, and in particular a good resilience, appears in the molten region.

The present invention also relates to an apparatus for use in carrying out the above process, the apparatus comprising electron beam welding equipment which is suitable for a particular type of application, namely the butt welding of two cylindrical pieces, and in particular of two lengths of tubular pipe.

Further features and advantages of the invention will become apparent from the following description of embodiments thereof, given by way of example only, with reference to the accompanying drawings.

DESCRIPTION OF THE PREFERRED EMBODIMENTS

FIGS. 1, 2, 3 and 4 show four particular examples of applications of the process according to the invention. In these four Figures, the same elements are designated by the same reference numbers.

Thus, the two pieces to be joined together by electron beam welding are designated 1 and 2.

The line, in the plane of the Figure, of the common surfaces over which the two pieces are to be joined together is designated 3.

The broken line bounding the contour of the remelting zone obtained during electron beam welding is designated 4.

Figure 1:
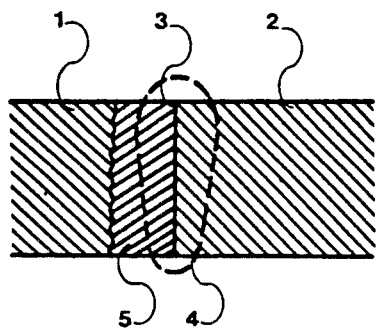
FIG. 1 is a section through two pieces which are abutted ready for welding according to a first embodiment of a process according to the invention.
Figure 2:
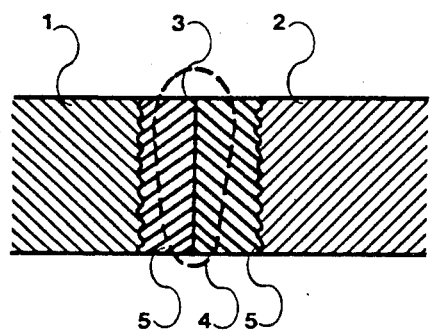
FIGS. 2 to 4 are sections similar to that of FIG. 1 through two pieces ready for welding according to second, third and fourth embodiments of a process according to the invention.

In FIGS. 1 and 2, material which has been deposited by means of a traditional arc welding process, respectively on one and on both of the pieces to be joined, is designated 5.

In the embodiment of FIG. 1, a weld bead 5 is initially produced by means of an arc welding process, for example in the factory, on one face of the piece 1, parallel to the opposed surface of the other piece 2 to which piece 1 is to be welded. The weld bead is then machined to produce a surface 3, which, in the present case, is planar, and which extends in a plane passing through the bead 5. The opposite surface of the piece 2 is also machined and is juxtaposed with the machined surface of piece 1 at the time when the two pieces are to be joined by electron beam welding, for example on a building site. It has been found that the seeds contained in the deposited bead 5 favor the formation of acicular ferrite in sufficient amounts to provide a substantial improvement in the mechanical and metallurgical characteristics of the welded joint obtained.

In the embodiment of FIG. 2, the piece 2 is treated in the same way as the piece 1, for example in a factory, and the surfaces 3 are welded to one another on a building site by means of an electron beam.

Figure 3:
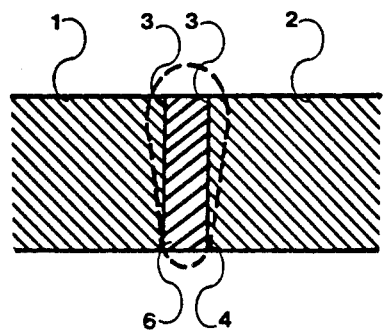

In FIG. 3, an insert obtained from a deposit produced beforehand by means of a traditional arc welding process is designated 6. This insert 6 is fixed between the two pieces 1 and 2 to be joined, and then the electron beam welding operation is carried out as already described, the remelting region during this welding operation surrounding the entire insert.

Figure 4:
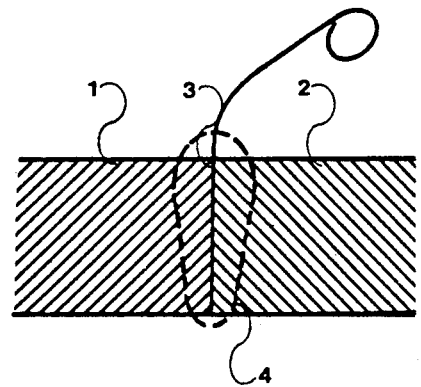

In FIG. 4 the two pieces 1 and 2 to be joined, whose surfaces 3 which have been duly machined, are brought into contact with one another. A wire prepared from a deposit obtained by arc welding is supplied during the welding operation; when electron beam welding takes place, the metal of this wire fulfills the function of the insert of FIG. 3, by providing the seeds necessary for the formation of acicular ferrite.

Figure 5:
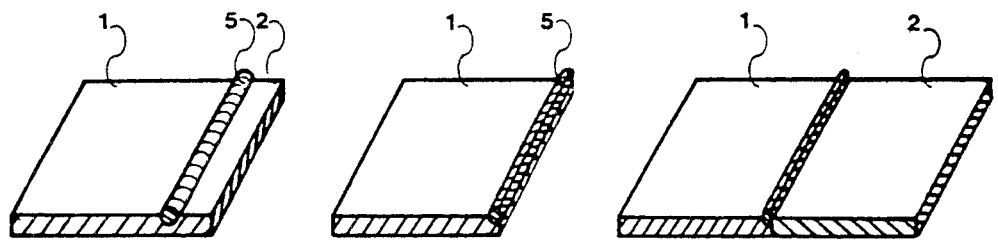
FIG. 5 is a perspective view showing three stages of another embodiment of a process according to the invention for welding two plates.

FIG. 5 shows three stages in another embodiment of the invention, in which a lateral weld bead 5 is first produced on a metal plate 1, in the region of one of the edges of the plate, the weld being made by a traditional arc welding process, after which a surface at which the plate 1 is to be welded to plate 2 by means of an electron beam, is produced, the surface lying in a plane passing through the mass of the weld bead 5. For the remainder of the operations, the situation corresponds to a case fairly similar to that of FIG. 1, the surface of plate 1 being in this embodiment made only partially of the material of the weld bead 5, although it can be completely produced thereof.

Figure 6:
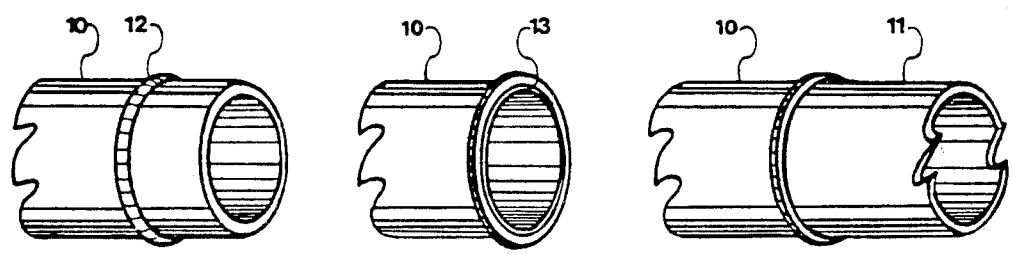
FIG. 6 is a perspective view showing three stages of yet another embodiment of a process according to the invention, for welding two tubular elements.

FIG. 6 also shows, in perspective, three stages of joining two tubular elements together according to an embodiment of the invention. A first tubular element 10 receives a preliminary lateral weld bead 12 obtained by means of a traditional arc welding process. The element 10 is then machined so as to present a surface 13 in a plane passing through the bead 12 and opposed to the corresponding surface, which has also been trued up, of the second tubular element 11 to be joined to the element 10. The elements are then brought together and held against one another, and the electron beam welding operation is carried out as before.

Practical examples of use of the invention are given below for the case of steel plate. The chemical composition of a weld produced in a conventional manner, by means of an electron beam, was as follows:

| C | Si | Mn | S | P | Ni | Cr | Mo | Cu |
|---|----|----|---|---|----|----|----|----|
| 0.071 | 0.26 | 1.53 | 0.006 | 0.034 | 0.21 | 0.034 | 0.25 | 0.004 |
| Co | Al | B ppm | Nb | Ti | V | Sn | Pb | $O_2$ |
| 0.011 | 0.16 | 6 | 0.040 | 0.010 | 0.067 | 0.001 | 0.008 | — |

The resilience $K_{cv}$ at $-10°$ C. had an average value, over five experiments, of: 2.6 daJ/cm$^2$.

In a first example, a process according to the invention was followed. The final composition of the weld was as follows;

| C | Si | Mn | S | P | Ni | Cr | Mo | Cu |
|---|----|----|---|---|----|----|----|----|
| 0.079 | 0.27 | 1.64 | 0.009 | 0.033 | 0.17 | 0.032 | 0.37 | 0.070 |
| Co | Al | B ppm | Nb | Ti | V | Sn | Pb | $O_2$ |
| 0.015 | 0.015 | 8 | 0.028 | 0.009 | 0.050 | 0.002 | 0.010 | 0.0271 |

The resilience at $-10°$ C. had an average value, over two experiments, of: 17.8 daJ/cm$^2$.

In a second example using a process according to the invention, the final composition of the weld was as follows:

| C | Si | Mn | S | P | Ni | Cr | Mo | Cu |
|---|----|----|---|---|----|----|----|----|
| 0.069 | 0.32 | 1.74 | 0.009 | 0.030 | 0.18 | 0.060 | 0.35 | 0.044 |
| Co | Al | B ppm | Nb | Ti | V | Sn | Pb | $O_2$ |
| 0.014 | 0.014 | 32 | 0.027 | 0.031 | 0.052 | 0.003 | 0.010 | 0.038 |

The resilience at $-10°$ C. had an average value of: 26.3 daJ/cm$^2$.

Figure 7:
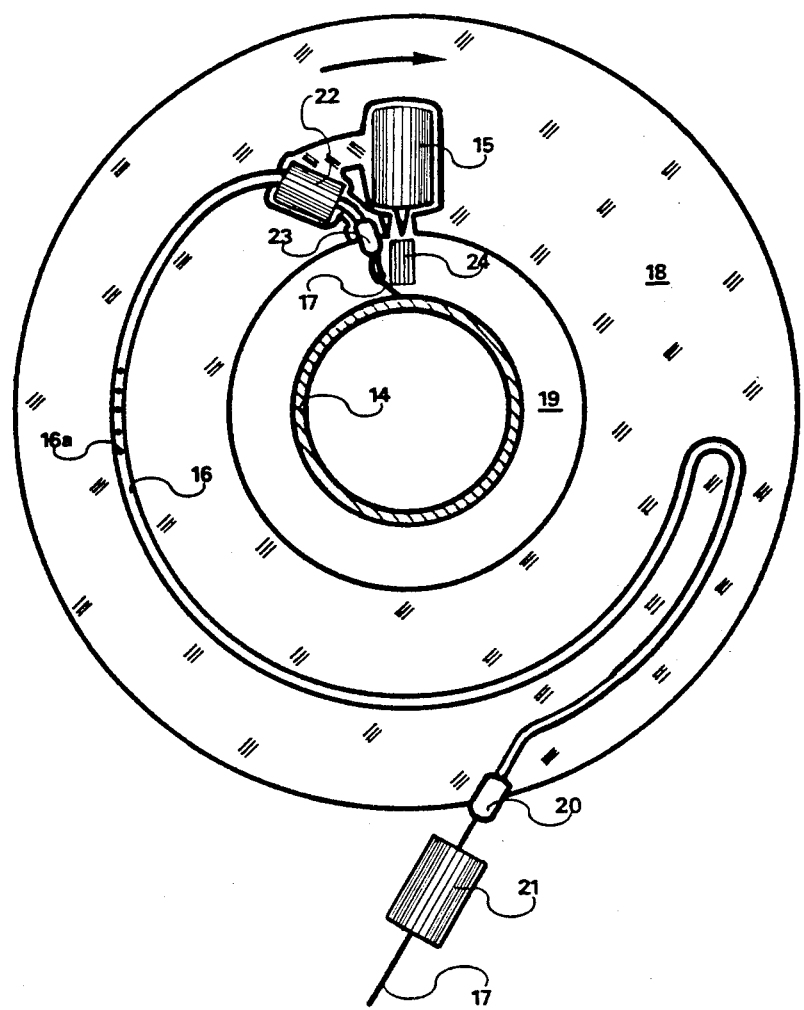
FIG. 7 shows, in transverse section, apparatus for use in carrying out a process according to the invention.

FIG. 7 shows an apparatus for use in carrying out a process according to the present invention, which apparatus is suitable for the electron beam welding of cylindrical pieces, for example of two elements of a tubular pipe.

The surface, in the plane of the Figure, of one of the tubular elements to be joined is designated 14.

The apparatus comprises an electron gun 15 which is mounted within a chamber 18 and a sheath 16 which extends inside the chamber 18 and receives internally a filler wire 17 which extends to the welding point, that is to say to the point of impact of the electron beam on the welding line.

The chamber 18 has the general shape of a torus and in use a high vacuum prevails within the chamber 18. The space 19 which is located radially within the torus, and in which the tubular elements to be welded are located, is also capable of being evacuated during the welding operation.

At various points, the sheath 16 possesses holes 16a which bring it into communication with the vacuum prevailing inside the chamber 18, in order to make it possible to pump out air which may inadvertently have been drawn in through a gasket 20 which is joined to the sheath 16 at its inlet and to the outer wall of the chamber 18 and ensures leaktightness at the point where the wire 17, originating from a primary motor-driven feed reel 21, enters the chamber. The gasket 20 is preferably of an adjustable type, and preferably of the inflatable type, with two positions, namely a sealing position which it assumes between two welding operations when the filler wire has been stopped, and an open position which it assumes throughout the duration of a welding operation.

As regards the sheath 16, it possesses, downstream of the gasket 20, a part of reduced cross-section closely fitting the filler wire 17, in order to improve the leaktightness at this point.

A secondary motor-driven feed reel 22 receives the wire 17 from the outlet of the sheath 16 and directs the wire towards the welding point. The speed of the second motor-driven feed reel 22 is controlled by the primary motor-driven feed reel 21. An inflatable gasket 23, of the same construction as the gasket 20, ensures the leaktight passage of the filler wire 17 downstream of the feed reel 22, at the outlet of the sheath 16, on a radially inner wall of the chamber. Along its path, between the electron gun 15 and the welding point, the electron beam passes through a withdrawable nozzle 24 which provides it with magnetic protection, the nozzle also providing the filler wire 17 with mechanical protection up to the point of impact.

It will be apparent that the apparatus shown with a single electron gun 15 may be provided with several guns distributed over the periphery of the welding line.

It is understood that the present invention is not limited to the embodiments which have been described above, and it can also form the subject of modifications of detail without thereby going outside the framework of the invention or exceeding its scope.

What is claimed is:

1. An apparatus for welding cylindrical pieces by means of an electron beam welding operation, comprising:
    a leak-tight chamber having a shape of a torus, said chamber having a high vacuum therein, said chamber having a sheath which has an inlet located on an outer wall of said chamber and an outlet located on a radially inner wall of said chamber, said chamber having an inner boundary forming an inner space which accommodates said cylindrical pieces;
    at least one electron gun located in said chamber;
    a wire obtained by arc welding a mild or slightly alloyed steel or by melting under slag a mild or slightly alloyed steel, said wire being made of a material which is different from a material of said cylindrical pieces, said wire material having between 100 and 800 ppm oxygen;
    means for displacing said wire through said sheath; and
    sealing gaskets, said sealing gaskets being connected to said sheath at said inlet and outlet thereof.

2. An apparatus for welding cyclindrical pieces by means of an electron beam welding operation, comprising:
    a leak-tight chamber having a shape of a torus, said chamber having a high vacuum therein, said chamber having a sheath which has an inlet located on an outer wall of said chamber and an outlet located on a radially inner wall of said chamber, said chamber having an inner boundary forming an inner space which accomodates said cylindrical pieces and is capable of being evacuated during the welding operation;
    at least one electron gun located in said chamber in the proximity of said sheath outlet;
    a wire made of a material to be introduced into a region of the pieces to be welded which is subjected to melting during the electron beam welding operation;
    means for displacing said wire through said sheath so that an end of the wire downstream of said sheath outlet is maintained in front of said electron gun; and
    sealing gaskets, said sealing gaskets being connected to said sheath at said inlet and outlet thereof.

3. The apparatus claimed in claim 1 or 2 further comprising a primary motor-driven feed reel for feeding said wire upstream of said sheath inlet, and a second motor-driven feed reel for feeding said wire upstream of said sheath outlet.

4. The apparatus claimed in claim 1 or 2 wherein said sheath has holes providing communication between an interior of said sheath and an interior of said chamber.

5. The apparatus claimed in claim 1 or 2 wherein said sheath has over a part of its length a reduced cross-section portion corresponding to a cross-section of said wire.

6. The apparatus claimed in claim 1 or 2 further comprising a withdrawable nozzle located in front of said electron gun to protect said electron beam against stray magnetic fields.

7. The apparatus claimed in claim 1 or 2 wherein said sealing gaskets comprise adjustable inflatable gaskets having a sealing configuration and an open configuration.

8. The apparatus claimed in claim 1 or 2 wherein said displacing means comprises a primary motor-driven feed reel located outside said chamber for feeding said wire through said sheath and a secondary motor-driven feed reel located inside said chamber for feeding said wire to said cylindrical pieces being welded, said secondary motor-driven feed reel being controlled by said primary motor-driven feed reel.

* * * * *